(12) United States Patent
MacDonald

(10) Patent No.: US 11,910,291 B2
(45) Date of Patent: *Feb. 20, 2024

(54) SENSOR AND SYSTEM FOR MONITORING DISPENSER LEVELS, TRAFFIC FLOW, AND STAFF LOCATION

(71) Applicant: Mero Technologies Inc., Toronto (CA)

(72) Inventor: James-Andrew Cole MacDonald, Toronto (CA)

(73) Assignee: Mero Technologies Inc., Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/727,297

(22) Filed: Apr. 22, 2022

(65) Prior Publication Data

US 2022/0248201 A1    Aug. 4, 2022

Related U.S. Application Data

(63) Continuation of application No. 16/813,005, filed on Mar. 9, 2020, now Pat. No. 11,317,264.
(Continued)

(51) Int. Cl.
*H04W 4/00* (2018.01)
*H04W 4/80* (2018.01)
(Continued)

(52) U.S. Cl.
CPC ........ *H04W 4/80* (2018.02); *G06Q 10/06311* (2013.01); *H04W 4/029* (2018.02); *H04W 4/14* (2013.01); *H04W 40/244* (2013.01)

(58) Field of Classification Search
CPC ..... H04W 4/80; H04W 40/244; H04W 4/029; H04W 4/14; H04W 4/021; H04W 4/33;
(Continued)

(56) References Cited

U.S. PATENT DOCUMENTS 5,945,910 A    8/1999   Gorra
6,553,336 B1   4/2003   Johnson et al.
(Continued)

FOREIGN PATENT DOCUMENTS

CA    2552123 C    3/2012
CA    2900688 A1   8/2014
(Continued)

*Primary Examiner* — Lakeram Jangbahadur
(74) *Attorney, Agent, or Firm* — Stephen J. Scribner

(57) ABSTRACT

An electronic material sensor for a container, such as a dispenser for paper or liquid materials, or a waste receptacle, in a facility such as a restroom. The material sensor may be adapted to fit inside an existing material dispenser. The material sensor provides wireless data transmission of the level of liquid or paper material in the container. A traffic sensor senses presence of people in the facility. An electronic beacon assigned to a user, such as a cleaning staff, tracks location of the user in the facility. In a system employing one or more sensors, including material sensors, traffic sensors, and beacons, the sensors send real-time data to a base station running a software application, to give details about levels of the materials and facility usage, and the location of cleaning staff. The system sends notifications to cleaning and maintenance staff when the materials need to be replenished and receptacles need to be emptied, and the system may be used by managers to schedule cleaning according to traffic and location of staff.

26 Claims, 9 Drawing Sheets

Related U.S. Application Data

(60) Provisional application No. 62/815,551, filed on Mar. 8, 2019.

(51) Int. Cl.
  *H04W 4/029* (2018.01)
  *G06Q 10/0631* (2023.01)
  *H04W 4/14* (2009.01)
  *H04W 40/24* (2009.01)

(58) Field of Classification Search
  CPC .............. H04W 4/20; H04W 40/246; G06Q 10/06311; G06Q 10/06312
  See application file for complete search history.

(56) References Cited

U.S. PATENT DOCUMENTS

| | | |
|---|---|---|
| 6,891,838 B1 | 5/2005 | Petite et al. |
| 7,224,642 B1 | 5/2007 | Tran |
| 7,230,528 B2 | 6/2007 | Kates |
| 8,364,546 B2 | 1/2013 | Yenni et al. |
| 8,774,623 B2 | 6/2014 | Drake et al. |
| 9,159,216 B2 | 10/2015 | Limbert et al. |
| 9,747,779 B2 | 8/2017 | Harris et al. |
| 9,830,565 B2 | 11/2017 | O'Toole |
| 9,959,743 B2 | 5/2018 | Morgan et al. |
| 10,066,379 B2 | 9/2018 | Schomburg et al. |
| 2002/0186141 A1 | 12/2002 | Jen et al. |
| 2005/0171634 A1 | 8/2005 | York et al. |
| 2006/0063523 A1 | 3/2006 | McFarland |
| 2007/0063833 A1* | 3/2007 | Kates .................. G08B 25/10 340/521 |
| 2009/0115604 A1 | 5/2009 | Thomas et al. |
| 2009/0119142 A1* | 5/2009 | Yenni .................. H04L 67/12 705/7.15 |
| 2013/0146501 A1 | 6/2013 | Zusmanis et al. |
| 2015/0022361 A1* | 1/2015 | Gaisser .................. H04N 23/13 340/573.1 |
| 2015/0170502 A1* | 6/2015 | Harris .................. G08B 21/245 340/573.1 |
| 2015/0206077 A1* | 7/2015 | Himmelmann ............. G06Q 10/063118 340/870.07 |
| 2016/0180688 A1* | 6/2016 | O'Toole .................. G06Q 10/06 340/517 |
| 2017/0051486 A1 | 2/2017 | Schomburg et al. |
| 2017/0118609 A1* | 4/2017 | Rodoni .................. B65F 1/14 |
| 2017/0190508 A1* | 7/2017 | Mallett .................. B65F 1/1473 |
| 2020/0288293 A1 | 9/2020 | MacDonald |

FOREIGN PATENT DOCUMENTS

| | | |
|---|---|---|
| CA | 2911245 A1 | 1/2015 |
| CA | 2704577 C | 10/2015 |
| CA | 2844890 C | 3/2016 |
| CA | 2995851 A1 | 2/2017 |
| CA | 3008613 A1 | 6/2017 |
| CA | 2882066 C | 8/2018 |

* cited by examiner

SENSOR AND SYSTEM FOR MONITORING DISPENSER LEVELS, TRAFFIC FLOW, AND STAFF LOCATION

RELATED APPLICATION

This application is a continuation of application Ser. No. 16/813,005, filed 9 Mar. 2020, and claims the benefit of the filing date of Application No. 62/815,551, filed 8 Mar. 2019, the contents of which are incorporated herein by reference in their entirety.

FIELD

The invention relates to sensors, systems, software, and methods that sense dispenser status, e.g., levels of materials such as liquid and paper products, including paper towel, toilet paper, soap, as well as garbage disposal levels, restroom traffic levels, and monitor location of cleaning staff, and send real-time data about the monitored parameters to users of the system, and/or to a base station or server. The sensors, systems, software, and methods may be used for managing maintenance of facilities such as restrooms, particularly in large buildings. Material sensors may be retrofitted to existing dispensers and equipment, avoiding costly hardware replacements.

BACKGROUND

The maintenance and cleaning of commercial buildings has been a challenge existing for over a century and the work is overseen by property managers. The property management industry is stable and mature, yet growth is imminent due to the urbanization of cities and the growth of urban centres, especially with large (e.g., >50,000 square foot) buildings. One major concern for the property management industry is low margins, and these low margins are largely dictated by high labour costs and supply wastages, especially in North America, among other problems. Solutions utilizing low-cost sensors and private telecommunications networks have been proposed, but no practical solution to date has been able to provide access to data without the requirement to change suppliers and/or hardware, a costly proposition.

Property managers typically manage a suite of cleaning staff who are responsible for the cleanliness of their facilities. Cleaning staff need to make manual checks on status and levels of washroom dispensers, which can be time-consuming and unnecessary. Furthermore, as part of these cleaning routines, cleaning staff may throw out a significant amount of usable products such as soap and paper supplies, resulting in increased expenses and a negative impact on the environment. When dispensers for materials such as soap, paper towel, or toilet paper reach a subjective level of emptiness, cleaning staff may refill the dispenser with new material to ensure that there is never an empty dispenser. Contract cleaning staff are often under pressure from their management to uphold a standard of quality to avoid complaints due to empty dispensers. As a result, the remaining soap and paper supplies may be discarded so that the dispenser can be refilled, even when there is still a significant usable amount of material remaining in the dispenser. For example, up to 30% may be discarded according to some studies, which increases supply costs and is damaging to the environment.

Environmental awareness is an increasing concern for property management companies. When materials such as soap, paper towel, or toilet paper are wasted, property management companies bear a significant environmental burden on top of the financial impact that the waste generates. Because of the mixed nature of most waste disposals in commercial facilities, paper and soap products generally are not recycled or re-used but simply thrown away in the garbage.

In addition to wasted supplies, cleaning staff time may be wasted because staff are typically dispatched on a routine basis that is not representative of the actual demand a building has. For example, restrooms near the entrance of a building may get more usage and traffic than those in a more remote location. There currently is no way for cleaners to know the number of patrons using the restrooms, resulting in more manual checks on those restrooms and dispensers and time wasted checking less-used restrooms and dispensers. The increased number of restroom checks increases labour time and reduces labour efficiency, and as a result is an additional cost due to routine-based labour. In most instances, there is little visibility from the property owner/manager to the cleaning staff, which may result in difficulty ensuring compliance with standards and reporting of work orders.

In some settings, there are options for built-in sensor technology in dispensers offered by soap and paper manufacturers, but these are often too costly for low- and mid-range commercial washrooms. The options offered by manufacturers provide little or no flexibility for dispensers already in place, and often require building owners or managers to purchase proprietary paper or liquid refills that are costlier than those from their previous supplier. There currently exist very few options for outfitting existing liquid and paper dispensers with sensor technology and data connectivity to provide analytics for building maintenance.

SUMMARY

According to one aspect of the invention there is provided a material sensor, comprising: an electronic circuit including a sensing device that senses a level of a material in a container; a communications device that relays data relating to the sensed level of the material to a base station; and a microcontroller that controls operation of the sensing device and the communications device.

In one embodiment, the material comprises a feature that calibrates the material sensor for selected levels of the material.

In one embodiment, the communications device relays the sensed level of the material to the base station wirelessly.

In one embodiment, the sensing device is an optical sensing device. In one embodiment, the sensing device is an optical proximity sensing device.

In various embodiments, the container is selected from a material dispenser and a material receptacle. The material dispenser may be a paper dispenser or a liquid dispenser. The material receptacle may be a waste receptacle or a recycling receptacle.

In one embodiment, the material sensor is adapted to be retrofitted to an existing material dispenser or material receptacle.

According to another aspect of the invention there is provided a system, comprising: at least one material sensor as described herein; a base station that communicates with the at least one material sensor; and a processor that receives data from the base station and performs one or more operations based on the data; wherein one said operation comprises sending a notification advising of the sensed level of material in a material dispenser or a material receptacle to a user.

In one embodiment, the system comprises one or more traffic sensor. Each traffic sensor comprises an electronic circuit including a sensing device that senses presence of a person in a selected location or within a selected proximity to the traffic sensor; a communications device that relays data relating to the sensed presence of the person to the base station; and a microcontroller that controls operation of the sensing device and the communications device. The microcontroller and/or the base station may log, compile, and/or process traffic data received from one or more traffic sensors to provide traffic statistics such as, for example, the number of patrons using a facility or in a specified area during a selected time period, on a selected day, etc.

In one embodiment, the system comprises a wireless (e.g., Bluetooth®-enabled) beacon that uniquely registers to the base station and provides location details of the beacon. The beacon may be carried by a user so that location details of the user are wirelessly provided to the base station, and in turn, to a manager or other user of the system.

In one embodiment, the notification comprises at least one of SMS and email.

According to another aspect of the invention there is provided a non-transitory computer-readable medium storing instructions thereon, that when executed by a computer, directs the computer to control operation of a system as described herein, including one or more of: receiving data from the at least one material sensor, traffic sensor, or cleaner beacon; storing the data; analyzing the data; determining statistics; and sending a notification relating to a sensed material level or a sensed traffic level to a user.

According to another aspect of the invention there is provided a non-transitory computer-readable medium storing instructions thereon, that when executed by a computer, direct the computer to control operation of a system as described herein, including one or more of: receiving data from one or more sensor; storing the data; analyzing the data; determining statistics from the data; and sending a notification relating to the data received from the one or more sensors to a user. The one or more sensors may be selected from material sensors, traffic sensors, and beacons; wherein the notification comprises at least one of a level of material in a dispenser, a level of material in a receptacle, a traffic level, and a location of a user.

In one embodiment, controlling operation of the system comprises sending a notification advising of the sensed level of material in a dispenser or a receptacle to a user. The notification may comprise at least one of SMS and email.

In one embodiment, determining statistics comprises long-term data analytics about one or more of material usage, maintenance history, and staff location.

According to another aspect of the invention there is provided a method for monitoring a material in a container, comprising: disposing an electronic sensing device in or on the container, wherein the electronic sensing device senses a level of the material in the container; communicating data relating to the sensed level of the material to a base station; and using a processor to perform one or more operations based on the data; wherein one said operation comprises sending a notification advising of the sensed level of the material in the container to a user.

In one embodiment, the communicating with the base station is performed wirelessly.

In various embodiments, the container is selected from a material dispenser and a material receptacle. In one embodiment, the material sensor is adapted to be retrofitted to an existing material dispenser or material receptacle.

In one embodiment, the method further comprises disposing an electronic traffic sensor that senses presence of a person in a selected location or within a selected proximity to the traffic sensor; communicating data relating to the sensed presence of the person to the base station; and using the processor to perform one or more operations based on the data relating to the sensed presence of a user; wherein sending a notification comprises advising of a number of people at the selected location.

In one embodiment the method further comprises assigning an electronic beacon to the user; wherein the beacon automatically establishes wireless communication with the base station when within a wireless communications range; wherein communication of the beacon with the base station indicates that the user is at the location of the base station; wherein a location of the user is logged according to the location of the base station.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1:
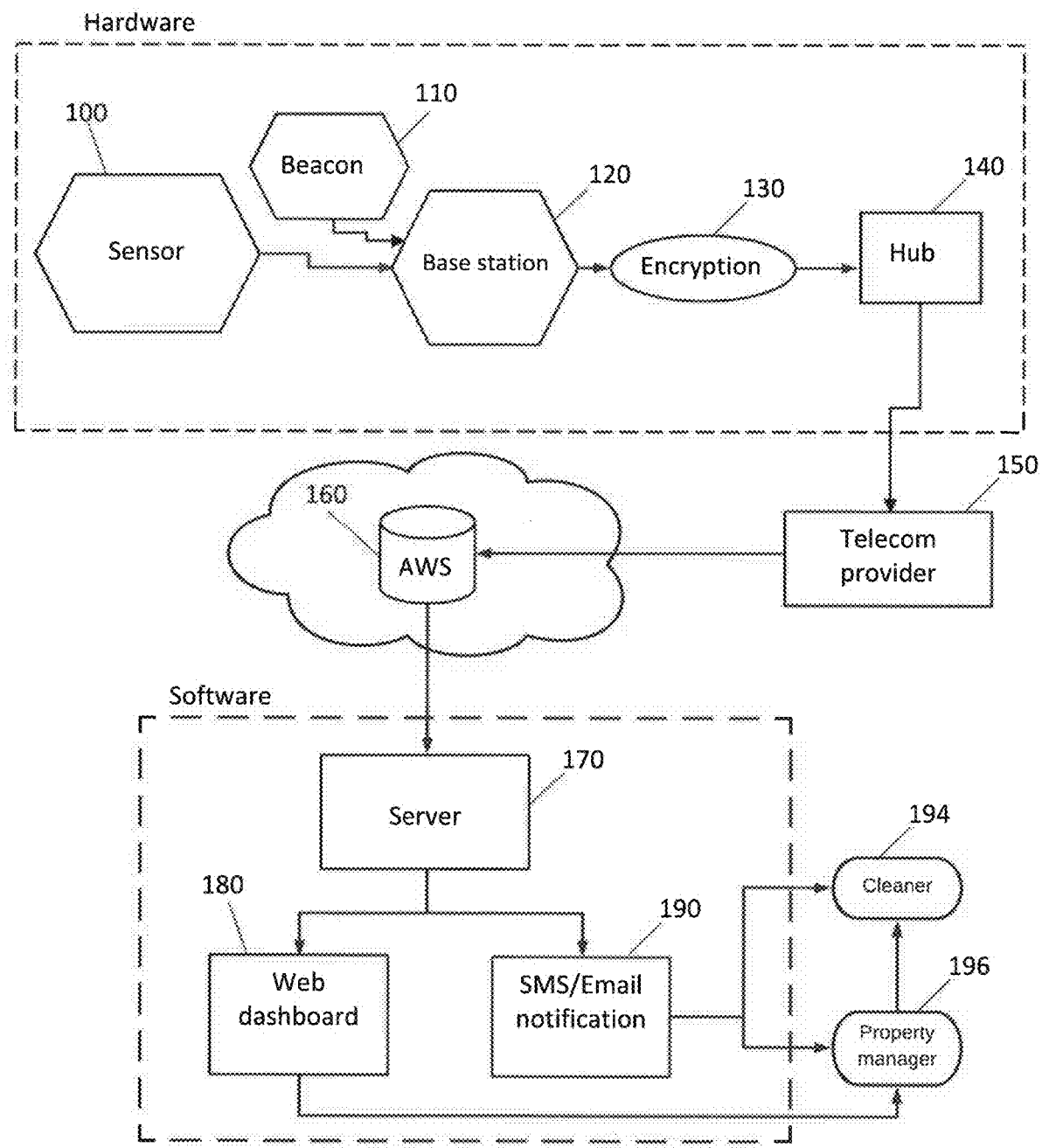
FIG. 1 depicts an information flowchart showing the flow of data throughout a system, according to one embodiment.

As property managers and companies become more concerned with efficient and environmentally-friendly practices to ensure the maximum satisfaction for tenants/clients, and to maximize their revenues, there exists a need to reduce costly manual checks for their cleaning services. This need can be addressed by embodiments presented herein, which provide sensor data for efficient monitoring of traffic, dispenser, and/or garbage disposal status and long-tem data analytics, and in turn provide insights necessary to add or improve efficiencies to daily maintenance operations and business practices.

In various aspects, the invention may include hardware sensors such as material sensors for dispensers and waste disposal receptacles (e.g., waste bins, recycling bins, organics collecting bins, etc.), generally referred to herein as "containers", that sense the level of material in a container;

traffic sensors that sense presence of a person in a selected location or within a selected proximity to the traffic sensor; and beacons that may be carried by users so that their location within a building or area may be sensed and/or tracked; systems incorporating such sensors, software for one or more of obtaining, compiling, and distributing sensor data, and sending notifications to users of the system, and methods for implementing the sensors, systems, and software. Embodiments have wide-ranging applicability in settings where remote monitoring of status of restrooms and equipment is required and/or beneficial. The term "restroom" is used herein to refer generally to any room or facility having dispensers such as those for liquid and paper materials and/or waste receptacles, and/or requiring cleaning services, such as, but not limited to, restrooms, washrooms, changing rooms, locker rooms, shower rooms, etc. Such facilities may be found in buildings including, but not limited to, commercial, public, or private buildings such as office buildings, government buildings, schools, colleges, universities, shopping malls, museums, galleries, airports, train stations, arenas, fitness centers, etc. Particular embodiments described herein are directed to assisting property management services and companies in maintenance of restrooms and surrounding areas. Some embodiments provide real-time analytics relating to restrooms and surrounding areas. However, it will be appreciated that the embodiments are not limited to such applications.

While the invention will be described in terms of particular embodiments and applications, in both summarized and detailed forms, it is not intended that these descriptions in any way limit its scope to any such embodiments and applications. It will be understood that many substitutions, changes, and variations in the embodiments, applications, and details of the methods, sensors, and systems described herein and of their operation can be made by those skilled in the art without departing from the spirit of the invention.

Unless otherwise indicated, all terms (including technical and scientific terms) used have the same meaning as commonly understood by one having an ordinary skill set in the art of which this invention belongs. It will be further understood that terms should be interpreted as having a meaning consistent with their meaning in the context of the relevant art, and this disclosure will not be interpreted in an idealized or overly formal sense unless expressly so defined herein.

The technology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include plural as well as singular for ns, unless the context clearly indicates otherwise.

According to one aspect of the invention, there is provided a material sensor including a sensing device and a microcontroller that detects the level of a material in a container, such as a replenishable material in a dispenser or a collected material in a receptacle, and wirelessly communicates with a base station. Communicating includes reporting the status of a material dispenser and/or a material receptacle to the base station. The status may include the detected level of the replenishable material, or at least when the dispenser is empty, and therefore needs to be refilled. In some embodiments, status may include, e.g., detecting when a dispenser has malfunctioned or is jammed. In some embodiments the material sensor is substantially adapted to be installed into an existing dispenser for the replenishable material, e.g., as a retrofit. In some embodiments a material sensor may be specifically designed to fit an existing design or brand of dispenser, and be installed from a factory and/or at the end user site. Material sensors that are adapted to be retrofitted to existing dispensers in restrooms, etc., avoid the need to replace existing dispensers for cost-effectiveness. This provides a solution that utilizes a building's existing equipment, so property managers/building owners are not required to invest in costly hardware installations or supplier contracts. Thus, managers and management companies can benefit from the embodiments that reduce environmental impact, provide real-time status data, and can be fitted to existing dispensers. Material sensors may also be adapted for use with receptacles for garbage, waste, recycling, composting, and the like, to detect and report the status, i.e., the level to which they are filled, and/or when they are full, and therefore need to be emptied.

As used herein, the term "dispenser" includes, but is not limited to, restroom dispensers such as those used for paper towel, toilet paper, feminine hygiene products, etc., condoms, soap, hand cream, hand sanitizer, and the like.

Another aspect of the invention relates to a traffic sensor that monitors traffic levels (i.e., human traffic) at a selected location wherein it is deployed, for example, in a facility such as a restroom, e.g., to measure the number of patrons using a restroom. The number of patrons in a restroom is a proxy for the cleanliness of a restroom, as higher usage rates would equate to higher supply usage and usage of sinks, toilets, and the like. A traffic sensor may include a microcontroller that controls operations such as logging and processing of traffic data, and a communications device that communicates with a base station, e.g., wirelessly. Communicating may include reporting the traffic data to the base station. In some embodiments the traffic sensor is adapted to be inconspicuous when deployed. In some embodiments a traffic sensor may be implemented together with a material sensor as described herein (e.g., on the same circuit hoard, via an expansion header, I2C bus, etc.), and may share certain components such as a microcontroller and/or communications device with the material sensor. With such traffic monitoring, cleaning staff can be dispatched proactively, and maintenance labour re-allocation can occur to address the busiest, high-priority areas first.

In some embodiments, material sensors and traffic sensors may be powered by a battery, for example a rechargeable lithium-ion battery, to ensure compatibility in a variety of applications. In some embodiments, material sensors and traffic sensors may be powered by a power adapter or other power source. For example, wiring may be provided in the wall or structure to which a dispenser is mounted, to provide power suitable for the power adapter or suitable for direct connection to the material or traffic sensor.

Material sensors and traffic sensors may be wirelessly connected to a base station. As used herein, the term "base station" is intended to refer to any microprocessor, computer, server, etc., that communicates with the sensors. The base station may support two-way communication with the sensors. The base station may perform one or more functions such as receiving, storing, compiling, analyzing, generating statistics of sensor data, as well as communicating with users of the system, such as sending notifications concerning status of dispensers. Two-way communication may provide functions such as, but not limited to, updating firmware to the base station and/or sensors, changing or updating sensors (e.g., sensor identification (ID number), version, sensor type, etc.) that are assigned to a base station, etc. The base station may be located between one or more sensors and a server or other equipment that stores and/or processes data and controls operation of the system. In some implementations of a system as described herein, two or more base stations may be used, and the two or more base stations communicate with a server and/or other equipment that stores and/or processes data and controls operation of the system. For example, when a system is implemented in a large building, a base station may be disposed in each location (such as each restroom) where data from one or more of material sensors, traffic sensors, and beacons (described below) are to be collected. Such data may be sent to a secure cloud storage system, via one or more base station, where it can be analyzed for long-term data-based decision making in relation to the facility, as well as controlling ongoing operations and sending notifications to users. This can include, but is not limited to, restocking decisions, staffing decisions, and workflows on a given day, week, etc.

In one embodiment, the system includes one or more wireless beacons. Each beacon is uniquely registered to the base station(s) and provides current location details of the beacon. The beacon may be carried by a user (e.g., cleaning staff) or disposed on a cleaning cart used by staff so that location details of the user or the cart are wirelessly provided to the base station. The beacon may communicate with the base station(s) through a wireless technology, such as Bluetooth®. For example, the beacon may include a Bluetooth-enabled microprocessor that communicates with each base station. Each beacon may be uniquely paired (i.e., assigned) to an individual user, so that details of the user's location may be forwarded to the base station(s) and servers. For example, because of the relatively small range of Bluetooth (e.g., up to about 15 in), the system may operate on the assumption that when a beacon is in range of a base station in a restroom, the user assigned to that beacon is attending to/cleaning that restroom at that time. The beacon-enabled staff location can be then used by building management to better understand labour allocation and routing throughout the building to improve efficiency. This may help inform staffing decisions, by indicating job performance and responsiveness for the beacon holder.

A beacon may be configured to communicate with the base station(s) at regular intervals. For example, a beacon may generate an outbound signal once every 15 seconds, or once every 30 seconds, or once per minute, etc. When the beacon is within range of a base station, it automatically establishes communications with the base station. In one embodiment the base stations are uniquely paired to the beacons so as to prevent any false readings from other Bluetooth-enabled devices.

In one embodiment a beacon may be implemented with a rugged outer case or shell, such as hard plastic, optionally with a shock-absorbing feature comprising a soft material such as rubber, silicon, etc., and may be small enough to be removably attached to clothing, carried in a pocket, or clipped to a keychain, etc. In various embodiments the beacon is battery powered, and may be rechargeable. Communication with a base station may include an indication of the status of the hatter (i.e., amount or level of charge), and at least one of the beacon, the base station, and the server may generate a notification when the battery requires replacement or recharging.

Sensors, systems, and methods described herein allow property managers to have substantially complete knowledge of the status of dispensers and receptacles in their facilities, amount of usage based on traffic data (i.e., numbers of patrons), and location of staff via an internet-based and/or mobile application, reducing or eliminating the requirement for manual checks, paper logs, phone calls, radio checks, etc., all of which are time-consuming and may be inaccurate. In some embodiments material sensors may be implemented without replacing existing soap, paper towel, toilet paper, hand sanitizer, etc., dispensers, as material sensors may be provided as a retrofit into the existing equipment. By retrofit, it is intended that a sensor may be installed into an existing dispenser with minimal or no modification, and preferably in a discrete nature. A traffic sensor may be installed discretely, e.g., near, on, or above a restroom door, on a wall or a ceiling, to measure the number of patrons entering a restroom, without any significant modification to building structures. The sensor data is readily accessible by cleaning and maintenance staff, where they can view in real-time the levels of washroom materials and traffic levels and receive real-time notifications when supplies are nearing empty or washrooms are busy. They can access the levels of the materials or traffic on each floor or section of the building they are working in, and the software brings their attention to various areas of the building requiring attention based on the sensor data.

In one embodiment, data collected from sensors may be sent to a secure cloud-server, where it is accessed and displayed by the software. The software may be accessed by cleaning and maintenance staff and building managers, who have separate uses for the technology. A building manager is defined broadly as an individual or group of individuals who are responsible for the cleaning staff attending to a building's restrooms and facilities. For example, cleaners accessing the software are able to view the status of restroom dispensers in real-time via, e.g., an SMS alert platform, and building managers are able to access a data analytics platform for usage data on the restroom.

A material sensor implemented for retrofitting to an existing dispenser, or receptacle may be attached to with, e.g., double-sided tape, adhesive, epoxy, Velcro™, mechanical fasteners, or any other attachment mechanism. Similarly, a traffic sensor may be attached to a door, wall, or ceiling with, e.g., double-sided tape, adhesive, epoxy, Velcro™, mechanical fasteners, or any other attachment mechanism. Due to the small size and lightweight nature of the electronic components, material and traffic sensors may be adapted to a wide variety of attachment options and surfaces to which they are applied, and may be installed inconspicuously. A material sensor is positioned so that it can gain an accurate reading of the amount of material in the dispenser, unimpeded by any other objects or parts. A traffic sensor is positioned so it can get an accurate reading of patrons entering a restroom. Material sensor retrofit installation may be handled by cleaning staff who have undergone training, e.g., through a contracted installation company, or any other individual with necessary qualifications to handle simple hardware technology installations. Sensors and systems may be provided with verbal, written, or video training.

After attachment, a material sensor may require calibration to the particular dispenser in which it is installed. For example, this may be accomplished by the sensor microcontroller connecting to the cloud server, which can be accessed on a smartphone or tablet, etc. Some embodiments may achieve calibration automatically. After calibration, the sensor is ready to use and can be set up to transmit data at a frequency specified by the user, e.g., every 15 minutes, every hour, every day, or any other rate selected during setup.

An embodiment will now be described with reference to FIG. 1 which depicts a flowchart showing general system operation. Of course, other configurations and implementations may be used, as would be apparent to one of ordinary skill in the art.

Referring to FIG. 1, a sensor 100 sends data packets relating to a sensed parameter to a base station 120. The sensor 100 may be a material sensor or a traffic sensor, or there may be both a material sensor and a traffic sensor. Data packets from a material sensor relate to the status of a dispenser, for example, the percentage of material remaining in the dispenser. Data packets from a traffic sensor relate to a measure of traffic in a facility. In one embodiment, communications with the base station may be implemented with Bluetooth Low-Energy (BLE) technology, and sensors may be BLE-enabled proximity-based sensors, but embodiment are not limited thereto. Thus the material sensor senses the remaining material level in the dispenser, and/or the traffic sensor senses traffic, and data packets are sent to a nearby base station 120 that is configured to be able to receive data from those devices (e.g., WiFi/BLE enabled). Additionally and/or optionally, a beacon 110 carried by a staff member may establish communication (e.g., via BLE) with the base station 120 when within range. The base station 120, of which there may be one or many depending on the size of the installation/building, transmits data to a communication device or modem, such as a 3G/4G/5G/long term evolution (LTE) hub 140. Following successful transmission, the base station 120 acts as a communication bridge to the hub 140 and can be connected via a single point or as a mesh network. Data packets are received from the base station and may be transmitted to the LTE gateway point through WiFi, and may be encrypted 130 with, e.g., secure sockets layer (SSL), transport layer security (TLS), or other technology, for security.

Data sent through to the hub 140 then reaches a cloud server 160 through a telecom provider 150 as may be locally available. The telecom provider 150 may connect to a "lambda" function, which receives the data and routes it appropriately, hosted, for example, on a web-based platform such as Amazon Web Services (AWS), a rational database system for storing and retrieving data. AWS provides an application program interface (API) to connect their database to a server such as a structured query language (SQL) server 170. The system software is then able to retrieve the data and display it in a manner which can be assessed by cleaning staff, maintenance personnel, and building managers/owners on the system server, Data may be displayed on a unique web dashboard 180, which may be designed for specific users, such as property managers (see FIG. 3), and the software may also trigger email; SMS notifications being sent to registered users 190, such as to devices of cleaning staff 194 and property managers 196 (see FIG. 2).

Figure 2:
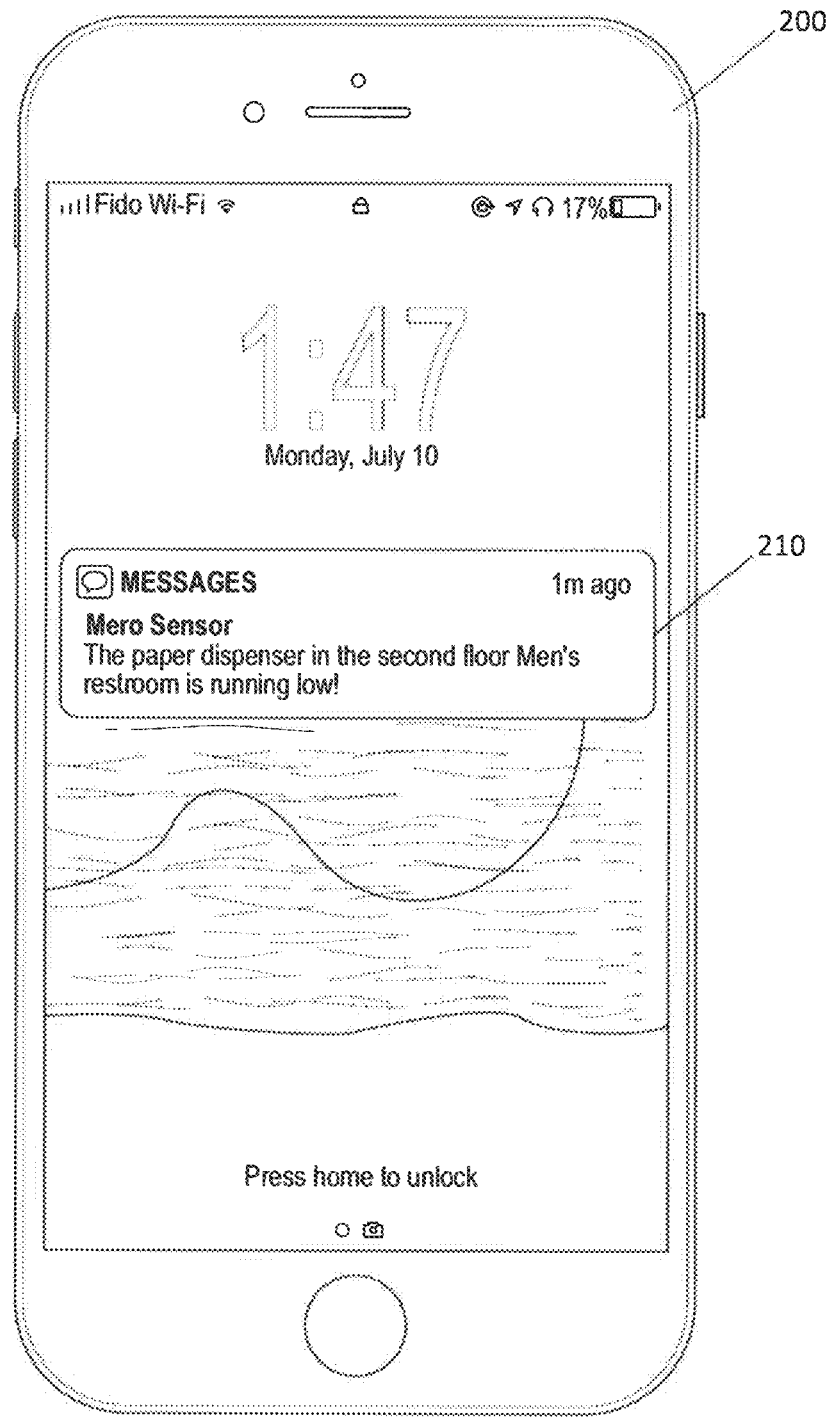
FIG. 2 depicts a cell phone interface for a notification portion of a software platform, according to one embodiment.

FIG. 2 depicts one form of an alert that would be received by a user (e.g., a member of the cleaning staff) about the status of a restroom. In this embodiment, it is displayed as an alert received on a cellular phone 200, such as an Apple iPhone™, but any other mobile device that can receive SMS, email, or other notifications may be used. In some embodiments, the notification is received via SMS-message 210, but any real-time alert that can be delivered to a mobile device is sufficient, including email or push notifications. All other characteristics shown in FIG. 2 are only for illustrative purposes and are not intended to be interpreted as restrictive in any way.

Figure 3:
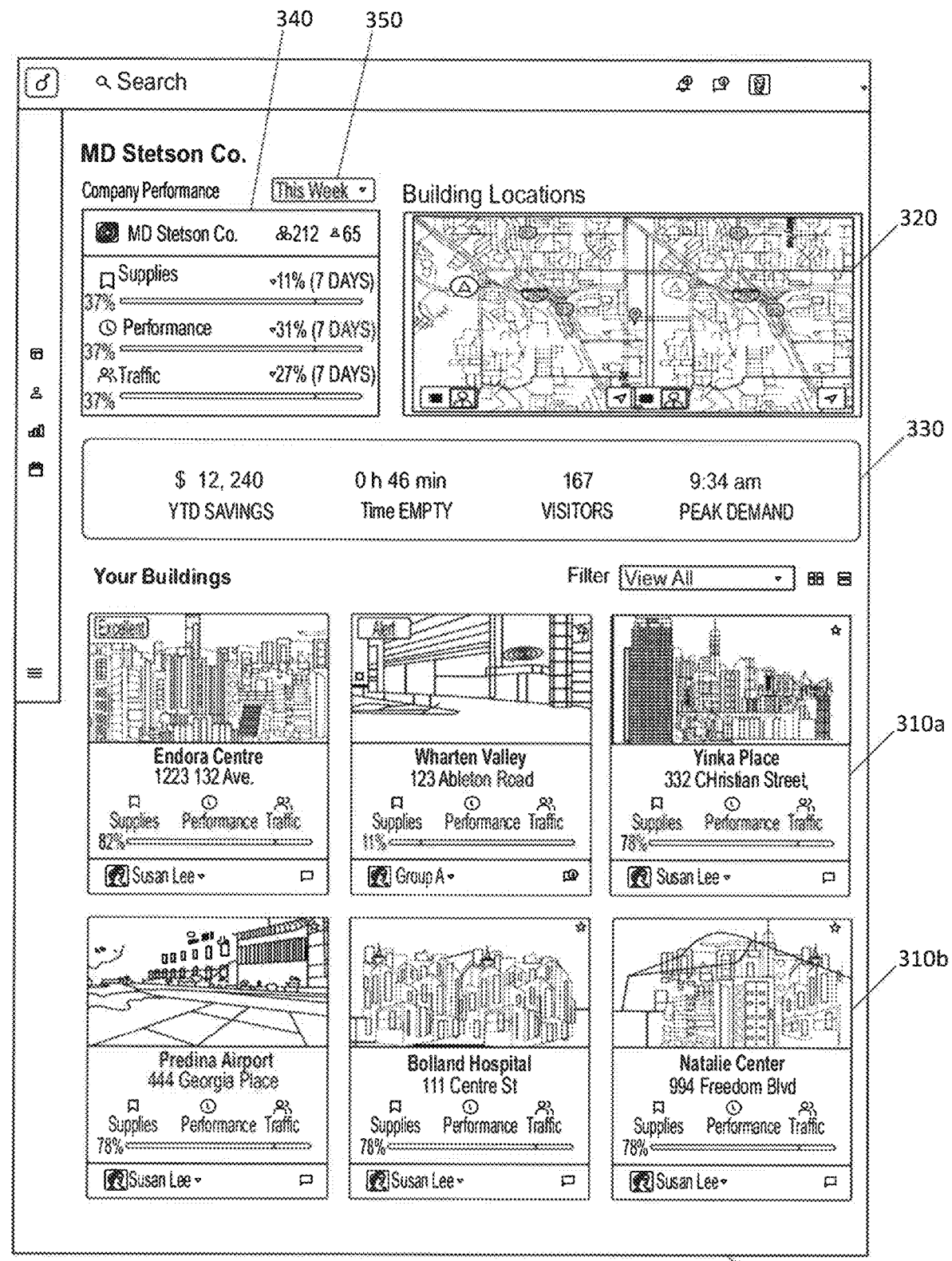
FIG. 3 depicts an example of a computer interface for the software platform intended for building owners or managers, according to one embodiment.

FIG. 3 depicts an example design of a software graphical user interface (GUI) that can be used by building owners, managers, or anybody with interest in and authorization to view the data transmitted by the sensors described herein, in this configuration, the platform displays a high-level overview 300 of an organization (referred to as "MD Stetson Co.") with multiple buildings or sites under management, each building or site (six are shown in this example) presented as a separate tile 310a, 310b, etc. in one embodiment the display includes a map 320 showing locations of one or more of the buildings. In one embodiment the display includes a tile showing statistics 330, which may be configured for a site, building, or specific facility within a site or building. In one embodiment the display includes a tile showing overall performance statistics 340 for the management company, which may be customized according to preferences; for example, the statistics may be displayed for a selected time period 350 such as daily, weekly, monthly, yearly, etc. The figure is intended to be a design example of a software interface and is not a definite or complete list of data inputs and features to be displayed. The data is shown on a computer interface but can be visualized on any suitable device that is connected to the Internet, including, but not limited to, a mobile phone, tablet, or computer. Together, FIGS. 2 and 3 are examples of user interfaces provided by software according to embodiments described herein.

Figure 4A:
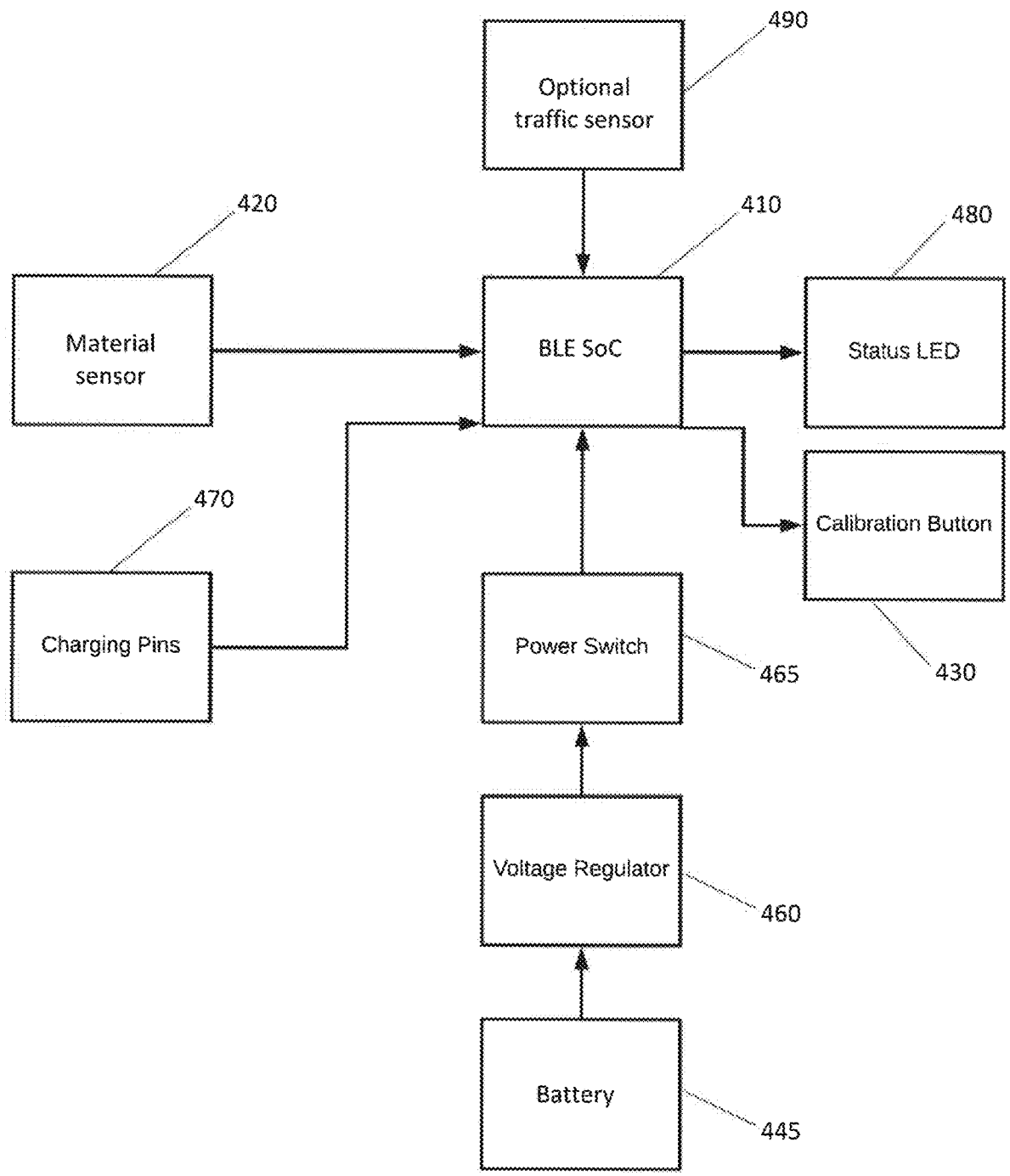
FIG. 4A is a block diagram showing circuit architecture of a material sensor with optional traffic sensor, according to one embodiment.

FIG. 4A is a block diagram showing circuit architecture of a material sensor with optional traffic sensor, according to an embodiment. The embodiment is based on an ultra low power 2.4 GHz system-on-a-chip (SoC) 410 with Bluetooth low energy (BLE) technology, such a nRF52832 (Nordic Semiconducor, Trondheim, Norway), although other systems may be used, Power is provided by a battery 445, which may be rechargeable, such as lithium-ion polymer (Lilo). A voltage regulator 460 ensures a constant voltage (e.g., 3 VDC) is supplied to the system, and may include components such as, e.g., a buck-boost converter (e.g., TPS63050, Texas Instruments, Dallas, Texas, USA), and a charge management controller (e.g., MCP73812, Microchip Technology Inc., Chandler, Arizona, US). Charging of the battery 445 may be accomplished by connecting a power source to the charging pins 470. A power switch 465 may be provided to allow power to the circuit. The material sensing device may be implemented with a proximity sensor 420. For example, an infra-red (IR) time-of-flight sensor, such as VL6180X (ST Microelectronics, Geneva, Switzerland) may be used. At least one calibration button 430 is used for calibration, for example, upon installation of the device, to obtain readings at full and empty conditions of a dispenser. These readings are then stored and used to determine the status of the dispenser, A status indicator, such as one or more LEDs, may be provided. For example, a multi-colour LED may be used, wherein different colours may be used to display one or more parameters of the sensor, battery condition, etc. In some embodiments, expansion ports or header may be provided to allow optional connection of additional sensors, such as material or traffic sensors. Embodiments may employ an inter-IC (I2C) bus, to connect and allow data transfer from multiple chips/sensing devices on the same bus. In the embodiment of FIG. 4A, an optional a traffic sensor 490 is connected via an expansion header. The traffic may be implemented with a motion sensor, such as a passive infra-red (PIR) sensor. Consequently, the traffic sensor and the material sensor can share system and communications resources of the system-on-a-chip 410, simplifying implementation and reducing cost.

In general, sensor circuitry is implemented on a printed circuit board (PCB), A material sensor circuit board may be designed with a specific shape, size, etc., for retrofit into an existing, liquid or paper dispenser, including, but not limited to, soap dispensers and dispensers for paper towel, toilet paper, feminine hygiene products, etc., of a variety of brands. A traffic sensor circuit board may be designed to be accommodated in a suitable housing for wall, door, ceiling, etc., mounting. As noted above, for some installations a material sensor and a traffic sensor may conveniently be implemented on the same circuit board and may share certain components. Such an embodiment would reduce hardware and installation costs.

Figure 4B:
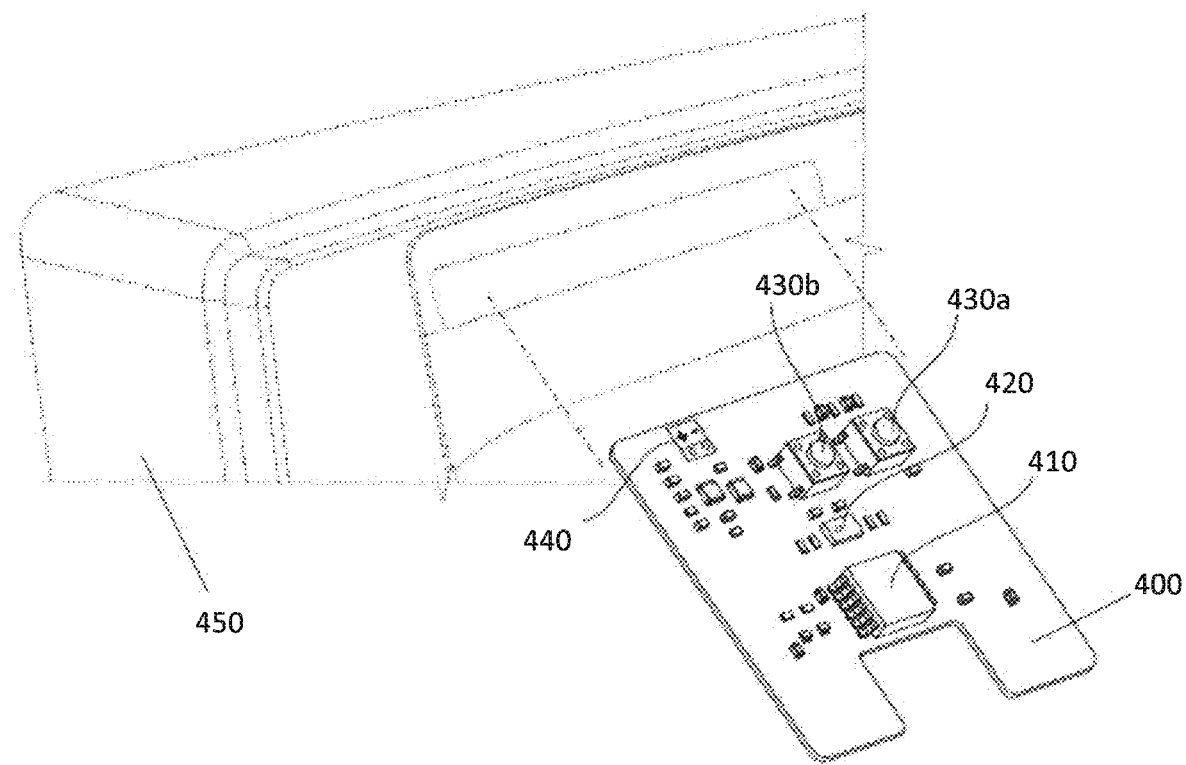
FIGS. 4B and 4C are line drawings showing a material sensor installed in a paper towel dispenser, according to one embodiment.
Figure 4C:
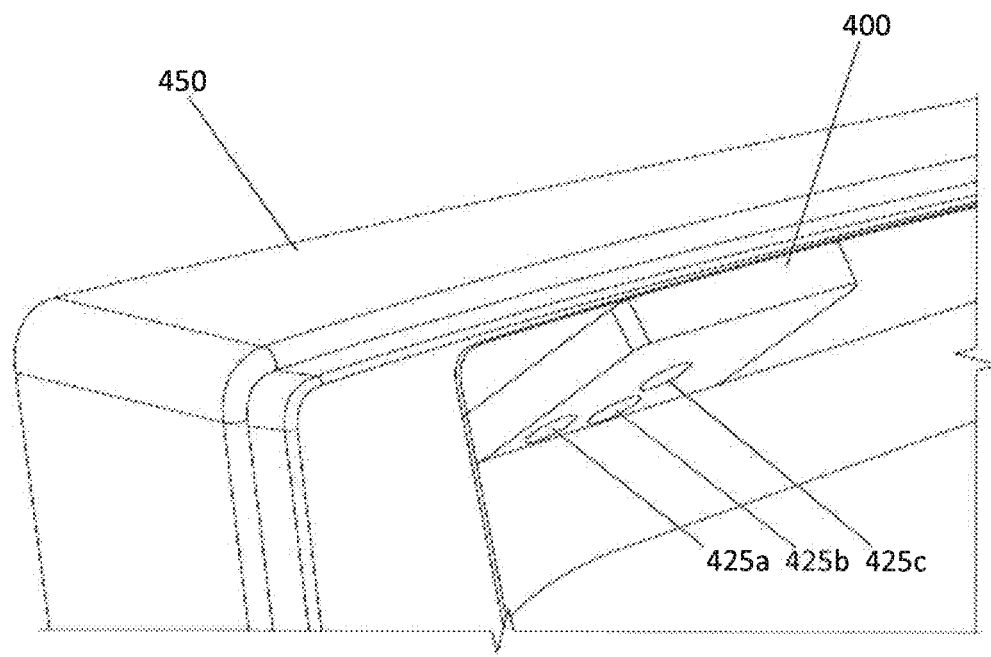

FIG. 4B is a line drawing of a material sensor circuit board 400 aligned for installation into the housing of a paper towel dispenser 450, according to one embodiment, and FIG. 4C shows the material sensor circuit board 400 installed in the housing. In both figures the paper towel dispenser is shown with its cover open.

In a typical installation, sensing components on the material sensor board 400 will be facing towards the material (e.g., paper product) with no obstructions, to allow for a clear reading of material remaining. Referring to FIG. 4B, one embodiment includes a BLE-enabled SoC microcontroller 410 (e.g., nRF52832, Nordic Semiconducor, Trondheim, Norway), which receives data from the connected sensing device and transmits data packets of sensor readings via Bluetooth, in this case, to a base station configured to receive these transmissions, as shown in FIG. 1. Data transmitted to the base station may include basic information identifying a material (or traffic) sensor, including, e.g., a sensor identification number (e.g., serial number, model number, version number, etc.), and sensor location (e.g., room number, etc.). Some of this basic information may be customizable, allowing a user or installer to identify a sensor and/or its location by a selected name (e.g., "west wing, third floor, men's room, paper towel dispenser"). The base station software may allow the system to be configured to group sensor readings and/or to search sensor readings according to, e.g., buildings, floors, genders, material (e.g., paper products, soap).

The embodiment of FIG. 4B includes an optical proximity sensing device 420, such as a laser proximity sensing device. Such a device can detect changes in amount of material in a dispenser to within one millimetre. In a typical installation this sensor is oriented toward the material (e.g., paper) that is being monitored. In one embodiment the sensing device may be a "time-of-flight" laser sensor, e.g., part VL6180XV0NR/1 manufactured by ST Microelectronics, where an optical laser beam is directed to an object (e.g., the material being monitored), the time for the reflected laser beam to return is measured, and a corresponding distance measurement is generated. This embodiment also includes buttons 430a, 430b used for calibration. In the installation of the device, a simple calibration is done to measure the dispenser at full capacity and at empty. The sensor circuitry then uses these calibrations to calculate a percentage of material remaining, so that data packets are sent as percentage of a particular material remaining, or only when a selected percentage of material remaining is reached. In some embodiments, data packets are sent out when the percentage of material remaining reaches or goes below a selected threshold (e.g., 25%, 20%, 15%, 10%, or 5%, etc.). In some embodiments, the data packet may indicate an urgent condition when the percentage of material remaining reaches a selected critical threshold (e.g., 10%, 5%, etc.), and optionally the degree of urgency, and/or frequency at which data packets are sent out, may increase as the percentage remaining decreases. Other types of calibrations may be performed depending on the implementation. This embodiment also includes a battery connector 440 for connection to a battery power source. For example, two 1.5 volt "AA" batteries may be used as a power source, although the sensor circuitry and/or board can be configured to utilize other portable power sources and voltages, e.g., a power adapter, to avoid the need for batteries. In some embodiments the microcontroller may monitor/detect the battery condition (i.e., level of charge remaining) and transmit data relating to the battery condition to the base station, so that a low battery may be detected and the battery can be replaced or recharged before running out of charge and rendering the sensor inoperative. In embodiments where space is available, the sensor board may include power adapter circuitry to convert any available source of power to that suitable for use by the sensor, e.g., an AC-DC converter. The hardware configuration, e.g., shape and/or size of the PCB and positioning of certain components such as the sensing device 420 and battery connector 440, may easily be adapted for retrofitting to various brands and designs of dispensers.

In some installations, a dispenser or receptacle may be implemented for dispensing or receiving more than one type of material. For example, a dispenser may dispense paper towels and soap, and a receptacle may have separate bins for waste, recycling, and compost. In such situations it may be desirable to connect sensors together, e.g., to share resources such as hardware and/or communications with the base station. Accordingly, some sensor embodiments may be configured for wireless or wired sensor-sensor connectivity. Wireless connectivity may be achieved using, e.g., Bluetooth, or other similar technology. For wired connectivity, a sensor board may include other components such as expansion ports so that two or more sensors may be connected together. Thus, for example, in a receptacle having bins for waste, recycling, and compost, a first material sensor may be deployed to sense the level of waste, and additional material sensors may be deployed to sense the levels of recycling and compost, wherein the additional material sensors are connected to the first material sensor wirelessly or via the expansion ports. In some embodiments, such wireless or wired sensor-sensor interconnectivity may allow for the connection of a traffic sensor, in one embodiment, an additional sensor circuit board that is designed for connectivity with a material or traffic sensor, and consequent sharing of resources, may be implemented with fewer components resulting in simplified construction and installation, and reduced cost. In one embodiment, a material sensor circuit board may include a traffic sensor and thus include components such a PIR sensor, while sharing resources and components such as power supply and SoC with the traffic sensor, resulting in simplified construction and installation, and reduced cost.

The sensor may be encapsulated or enclosed in a hard epoxy or plastic casing, e.g., made from polylactic acid (PLA), although it is not limited to this type of casing and can be enclosed in other suitable materials or in other shapes. An embodiment based on optical sensing devices, such as that shown in FIGS. 4B and 4C, may be enclosed in a casing with one or more windows (e.g., as shown at 425a, 425b, 425c) that enable an optical line-of-sight from the optical sensing device to the material being monitored, while allowing convenient mounting of the sensor to the dispenser. The embodiment shown in FIGS. 4B and 4C may be installed in substantially any liquid or paper dispenser, using an adhesive, fastener, or other attachment mechanism as described above.

Figure 5:
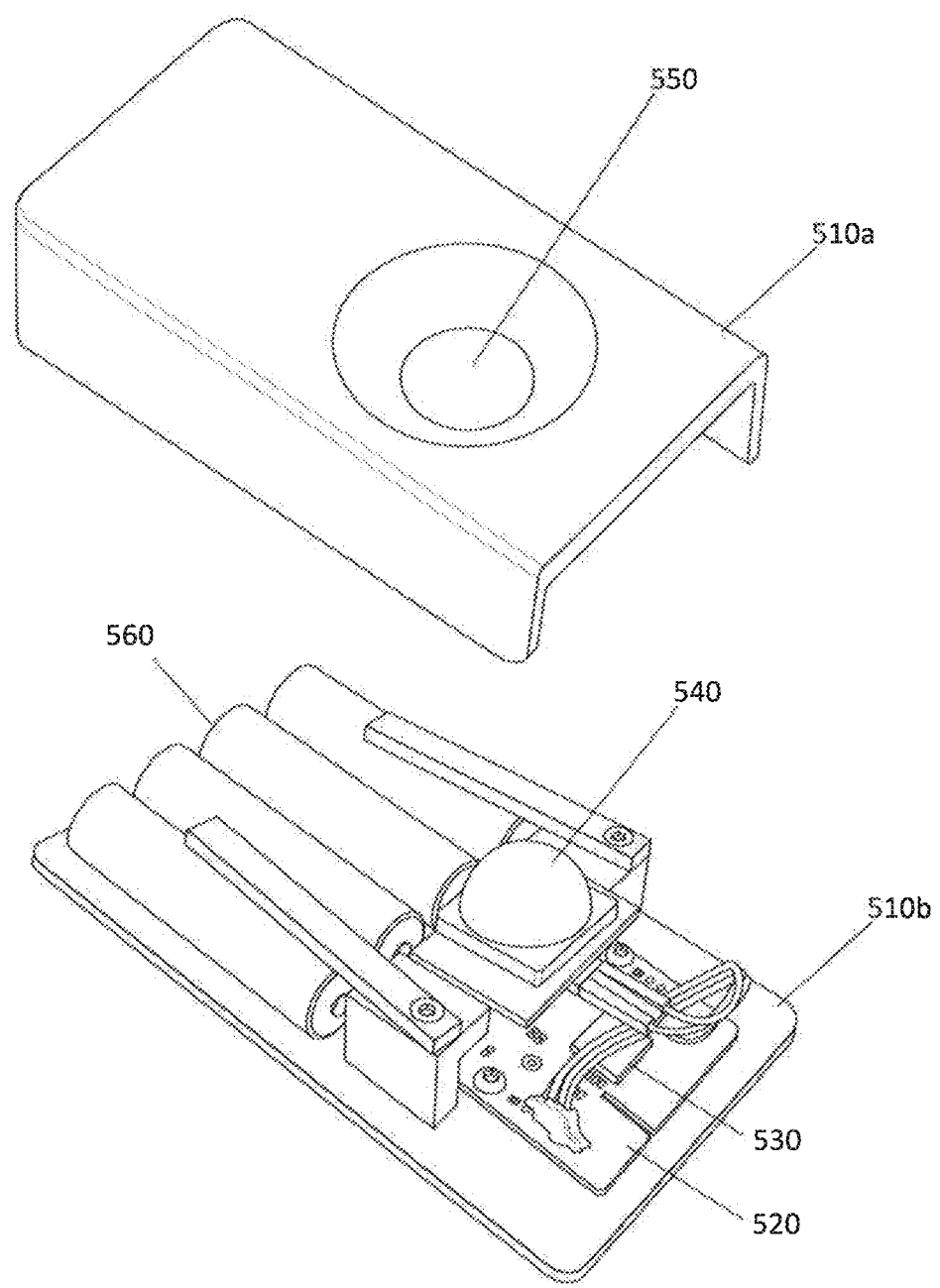
FIG. 5 is a line drawing of a traffic sensor, according to one embodiment.

Traffic sensor embodiments may be constructed similarly to the material sensor embodiment described) above. An embodiment suitable for deployment on a wall or ceiling, for example, is shown in FIG. 5. This embodiment has a housing including a base portion 510b and a cover portion 510a. A circuit board 520 is mounted on the base portion 510a and includes circuitry, at least some of Which may be similar to that of a material sensor, including a Bluetooth-enabled SoC 530. A sensing device 540, which may be a passive infra-red (PIR) sensor (e.g., SB612, Senba Sensing Technology Co. Shenzhen, China) is mounted for proper sensing through a window 550 provided in the cover portion 510a. Power is provided by a power supply, such as batteries 560, which may be rechargeable, and optional power regulation circuitry. As noted above, in some embodiments a traffic sensor is implemented together with a material sensor (e.g., on the same circuit board), and may share certain components such as the SoC and power supply.

In some embodiments, material sensors and traffic sensors may be powered by a rechargeable lithium-ion battery, to ensure compatibility in a variety of applications. In some embodiments, material sensors and traffic sensors may be powered by a power adapter or other power source. For example, wiring may be provided in the wall or structure to which a dispenser is mounted, to provide power suitable for the power adapter or suitable for direct connection to the material or traffic sensor.

Figure 6:
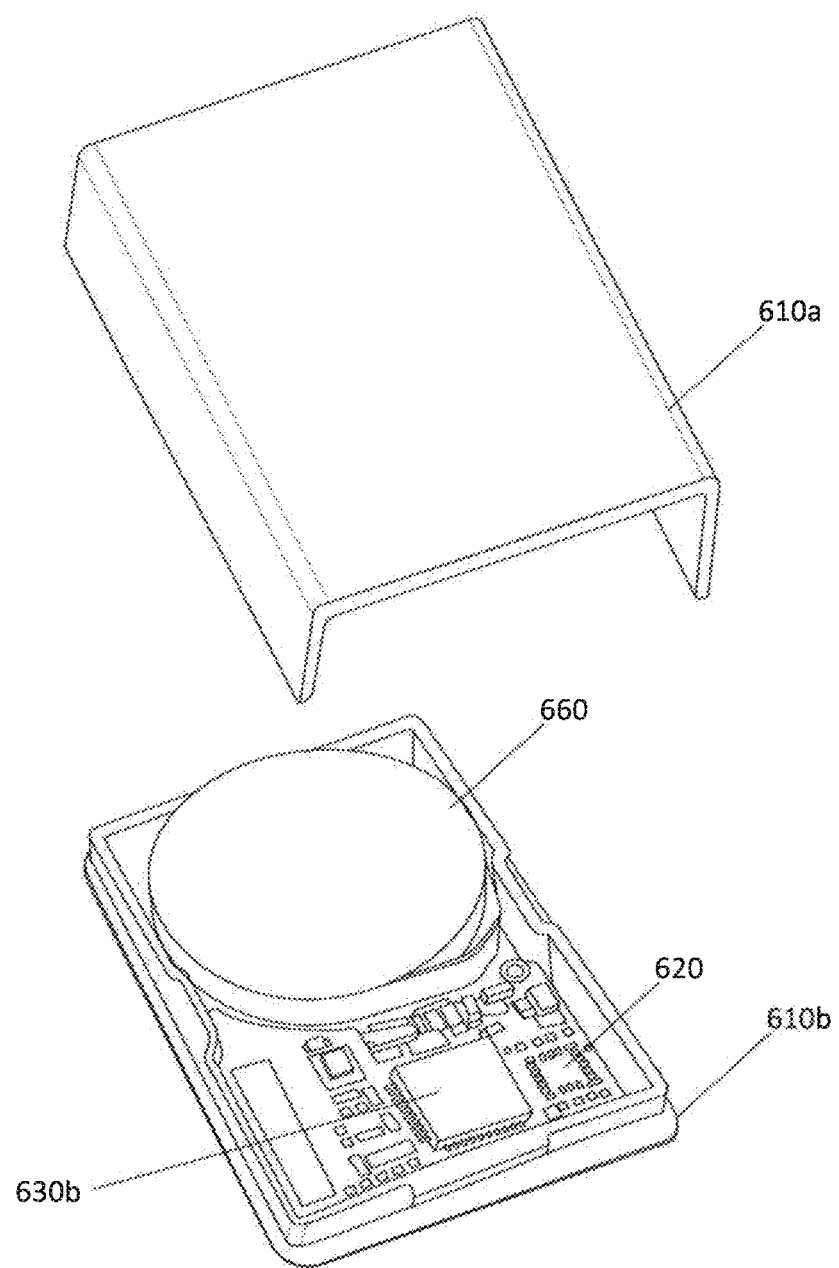
FIG. 6 is a line drawing of a beacon, according to one embodiment.

FIG. 6 shows an implementation of a beacon. In this embodiment the beacon has a housing including a base portion 610b and a cover portion 610a. A circuit board 620 is mounted on the base portion 610a and includes circuitry, including a Bluetooth-enabled SoC 630. Power is provided by batteries 660, which may be rechargeable, and optional power regulation circuitry. The housing may be provided with a feature such as an aperture or loop (not shown) that allows it to be clipped to a keychain or clothing, etc.

Figure 7:
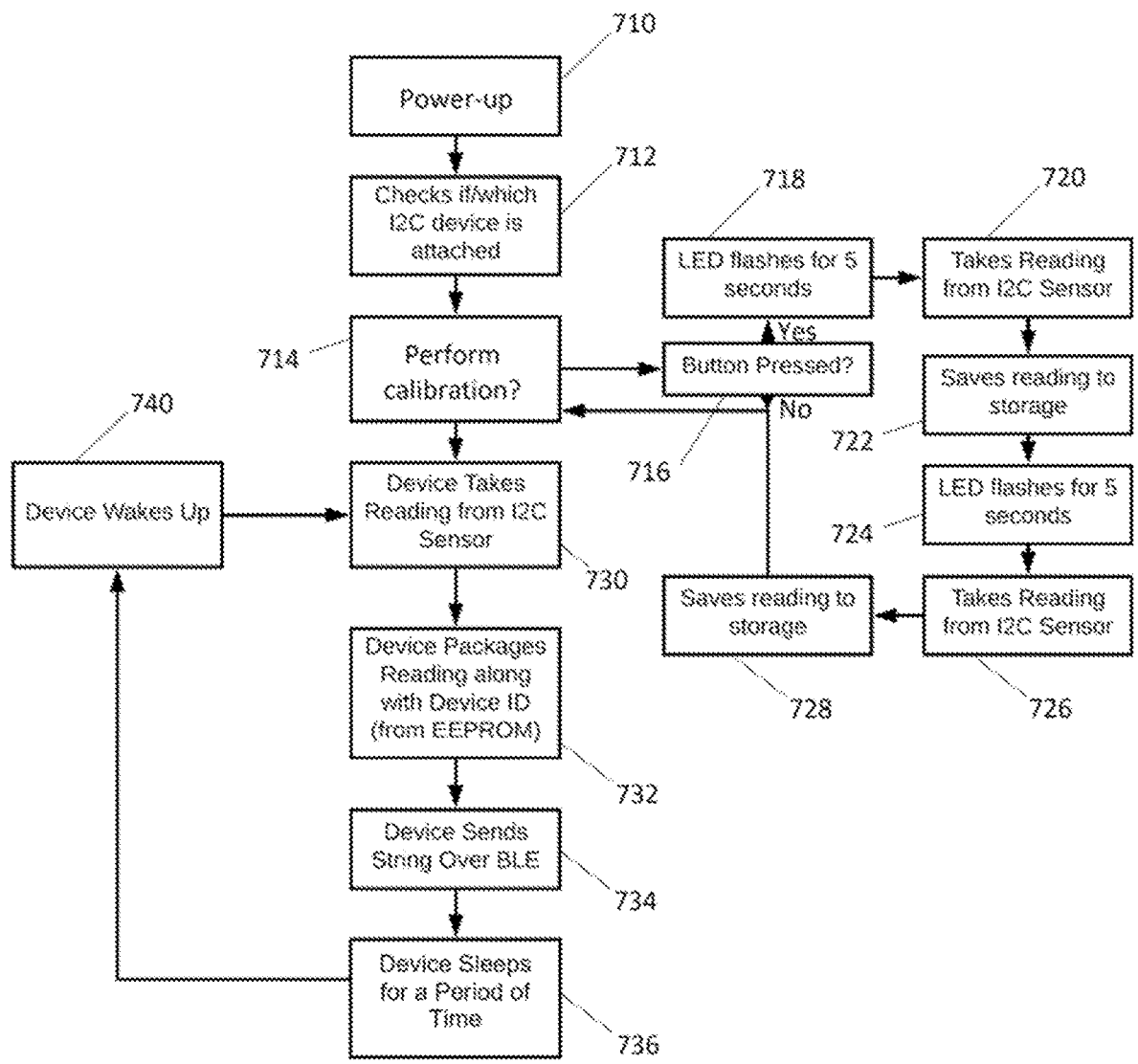
FIG. 7 is a block diagram showing operation of a material sensor, according to one embodiment.

FIG. 7 is an example of a software algorithm which may be stored in and executed by a material sensor. According to this embodiment, the device may enter sleep/wake modes according to configurable schedules and/or according to activity. The SoC on which the algorithm is executed may provide features for implementing sleep/wake modes. Upon power-up 710 the sensor performs a check 712 to determine status, identity, etc., of one or more connected sensing device. A calibration procedure 714 is performed if enabled by manual pressing of a calibration button, which is confirmed at 716. For example, when a material sensor is newly installed is a dispenser, a calibration procedure may be required. Initiation of the calibration procedure is confirmed by a visual indicator, such as flashing of an LED 718 for a duration, e.g., 5 seconds. The calibration procedure may include taking first and second sensor readings and storing the sensor readings, 720-728. For example, first and second readings may correspond to first and second levels of material in the dispenser. If the button is pressed calibration is not performed and the system proceeds to step 730. At 730 a sensor reading is taken, the data is then packaged 732 together with other relevant information such as device ID, location, etc., some of which may be stored in the system memory (e.g., EEPROM), and transmitted 734 to a base station, server, etc. using, e.g., Bluetooth. The device may then enter a sleep mode 736 for a selected duration or during a period of inactivity, at the end of which it awakens 740 and takes another sensor reading 730.

Figure 8:
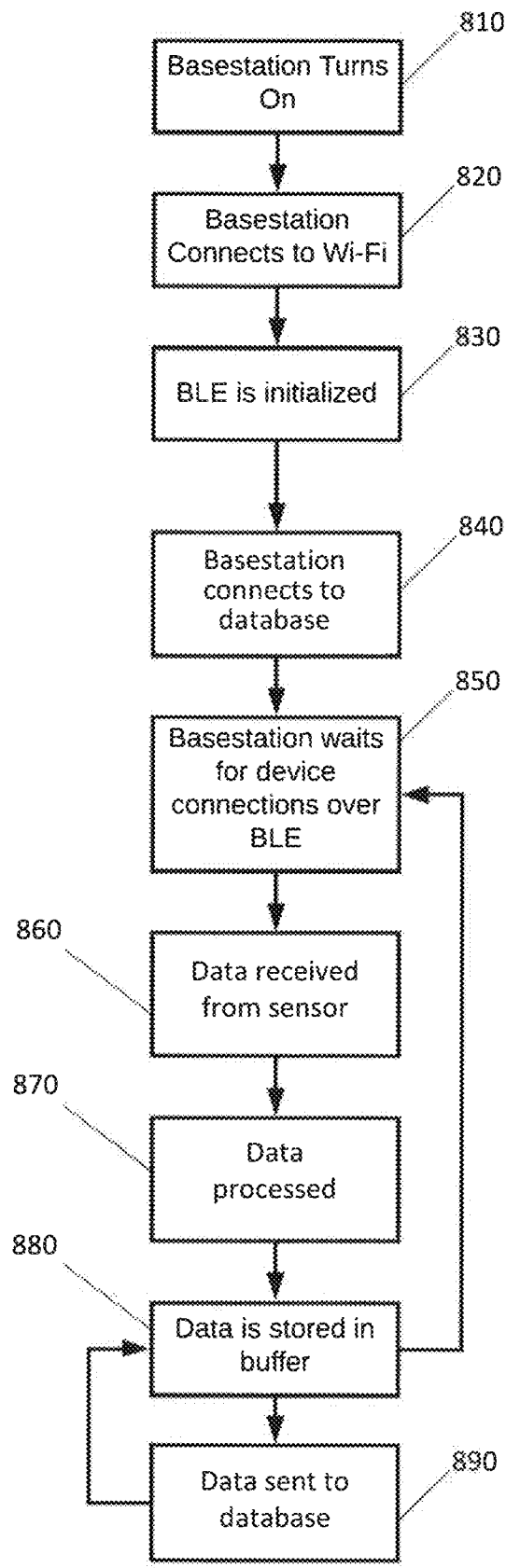
FIG. 8 is a block diagram showing operation of a base station, according to one embodiment.

FIG. 8 is an example of a software algorithm which may be stored in and executed by a base station. According to this embodiment, upon turn-on 810, the base station connects 820 to a communications network such as a local area network (IAN) which may be wireless (e.g., Wi-Fi) or wired (e.g., ethernet, optical, etc.). Bluetooth or other communication protocol is initialized at 830, which may be used to connect to material sensors, traffic sensors, beacons, etc., as described herein, at 850. A connection to a database, which may be a web-based platform such as, e.g., Amazon Web Services (AWS), is established at 840. Data packets corresponding to sensor readings and beacons are received 860, and may be subjected to processing 870 such as parsing, etc., and then stored in a buffer 880 and sent to the database 890 for storage and retrieval. The system awaits further communications and receipt of data packets from sensors and beacons. The data may be retrieved from the database and used for generating notifications (e.g., FIG. 2), management, compiling statistics, (e.g., FIG. 3), etc.

EQUIVALENTS

Although the invention has been described with reference to certain embodiments and specific examples thereof, it will be readily apparent to those of ordinary skill in the art that other embodiments achieve similar functions or results. All such equivalent embodiments and examples are within the scope of the invention, are contemplated thereby, and are intended to be covered by the following claims.

The invention claimed is:

1. A material sensor, comprising:
an electronic circuit including a sensing device that directly senses a level of a material in a container at a selected period of time according to a sleep and wake schedule;
a communications device that transmits data to a base station at the selected period of time according to the sleep and wake schedule; and
a microcontroller that executes an algorithm that implements the sleep and wake schedule and that controls operation of the sensing device and the communications device;
wherein the material sensor is adapted to be retrofitted to the container using a material sensor calibration procedure implemented by an algorithm executed by the microcontroller, including:
obtaining a first sensed level of the material in the container from the sensing device;
storing the first sensed level of the material;
obtaining a second sensed level of the material in the container from the sensing device;
storing the second sensed level of the material;
wherein the communications device transmits the stored first and second sensed levels of the material in the container to the base station;
wherein the microcontroller calculates an actual amount of the material in the container by comparing the directly sensed level of material in the container with the stored first and second sensed levels of the material in the container;
wherein the communications device transmits the calculated actual amount of material in the container to the base station according to the sleep and wake schedule.

2. The material sensor of claim 1, wherein the communications device transmits the data to the base station wirelessly.

3. The material sensor of claim 1, wherein the sensing device is an optical sensing device.

4. The material sensor of claim 1, wherein the container is selected from a material dispenser and a material receptacle.

5. The material sensor of claim 4, wherein the material dispenser is selected from a paper dispenser and a liquid dispenser.

6. The material sensor of claim 4, wherein the material receptacle is selected from a waste receptacle and a recycling receptacle.

7. The material sensor of claim 4, wherein the material sensor is adapted to be retrofitted to an existing material dispenser or material receptacle.

8. A system, comprising:
at least one material sensor comprising an electronic circuit including a sensing device that directly senses a level of a material in a container at a selected period of time according to a sleep and wake schedule;
a communications device that transmits data to a base station at the selected period of time according to the sleep and wake schedule; and
a microcontroller that executes an algorithm that implements the sleep and wake schedule and that controls operation of the sensing device and the communications device;
wherein the material sensor is adapted to be retrofitted to the container using a material sensor calibration procedure implemented by an algorithm executed by the microcontroller, including:
obtaining a first sensed level of the material in the container from the sensing device;
storing the first sensed level of the material;
obtaining a second sensed level of the material in the container from the sensing device;
storing the second sensed level of the material;
wherein the communications device transmits the stored first and second sensed levels of the material in the container to the base station;
wherein the microcontroller calculates an actual amount of the material in the container by comparing the directly sensed level of material in the container with the stored first and second sensed levels of the material in the container;
wherein the communications device transmits the calculated actual amount of material in the container to the base station according to the sleep and wake schedule;
the system further comprising:
a base station that communicates with the at least one material sensor; and
a processor that receives data from the base station and performs one or more operations based on the data;
wherein one said operation comprises sending a notification advising of the calculated actual amount of material in a material dispenser or a material receptacle to a user.

9. The system of claim 8, further comprising a traffic sensor;
wherein the traffic sensor comprises an electronic circuit including a sensing device that senses presence of a person in a selected location or within a selected proximity to the traffic sensor as a measure of traffic;
a communications device that transmits data relating to the measure of traffic to the base station; and
a microcontroller that controls operation of the sensing device and the communications device.

10. The system of claim 9, further comprising a beacon;
wherein the beacon is assigned to the user;
wherein the beacon comprises an electronic circuit including a communication device that automatically establishes wireless communication with the base station when within a wireless communications range; and
a microcontroller that controls operation of the communications device;
wherein communication of the beacon with the base station indicates that the user is at the location of the base station.

11. The system of claim 8, wherein the notification comprises at least one of SMS, email, and push notification.

12. The system of claim 8, wherein the notification is a real-time notification.

13. A non-transitory computer-readable medium storing instructions thereon, that when executed by a computer, direct the computer to control operation of-a system comprising:
at least one material sensor comprising an electronic circuit including a sensing device that directly senses a level of a material in a container at a selected period of time according to a sleep and wake schedule;
a communications device that transmits data to a base station at the selected period of time according to the sleep and wake schedule; and
a microcontroller;
wherein executing the stored instructions includes the microcontroller executing a control algorithm that implements the sleep and wake schedule and that controls operation of the sensing device and the communications device;
wherein the material sensor is adapted to be retrofitted to the container using a material sensor calibration procedure implemented by an algorithm executed by the microcontroller, including:
obtaining a first sensed level of the material in the container from the sensing device;
storing the first sensed level of the material;
obtaining a second sensed level of the material in the container from the sensing device;
storing the second sensed level of the material;
wherein the communications device transmits the stored first and second sensed levels of the material in the container to the base station;
wherein the microcontroller calculates an actual amount of the material in the container by comparing the directly sensed level of material in the container with the stored first and second sensed levels of the material in the container;
wherein the communications device transmits the calculated actual amount of material in the container to the base station according to the sleep and wake schedule;
the system further comprising:
a processor that receives data from the base station and performs one or more operations based on the data;
wherein controlling operation of the system includes one or more of:
receiving data from one or more sensors;
storing the data;
analyzing the data;
determining statistics from the data; and
sending a notification relating to the data received from the one or more sensors to a user.

14. The non-transitory computer-readable medium of claim 13;
wherein the one or more sensors are selected from material sensors, traffic sensors, and beacons;
wherein the notification comprises at least one of a calculated actual amount of material in a dispenser, a calculated actual amount of material in a receptacle, a traffic level, and a location of a user.

15. The non-transitory computer-readable medium of claim 13, wherein the notification comprises at least one of SMS, email, and push notification.

16. The non-transitory computer-readable medium of claim 13, wherein determining statistics comprises long-term data analytics about material usage and maintenance history.

17. The non-transitory computer-readable medium of claim 13;
wherein the notification is a real-time notification.

18. A method for remote monitoring of at least one parameter of a facility, comprising:
disposing a material sensor in or on a container of the facility, wherein the material sensor includes a sensing device that directly senses a level of a material in the container at a selected period of time according to a sleep and wake schedule;
calibrating the material sensor using a calibration procedure implemented by an algorithm executed by a microcontroller, including:
obtaining a first sensed level of the material in the container from the sensing device;
storing the first sensed level of the material;
obtaining a second sensed level of the material in the container from the sensing device;
storing the second sensed level of the material;
wherein the microcontroller calculates an actual amount of the material in the container by comparing the directly sensed level of material in the container with the stored first and second sensed levels of the material in the container;
using a communications device to transmit data relating to the stored first and second sensed levels of the material in the container and the calculated actual amount of the material in the container to a base station at the selected period of time according to the sleep and wake schedule;
using the microcontroller to execute a control algorithm that implements the sleep and wake schedule and that controls operation of the sensing device and the communications device; and
using a processor in the base station to perform one or more operations based on the data;
wherein one said operation comprises sending a notification advising of the calculated actual amount of the material in the container to a user.

19. The method of claim 18, wherein the container is selected from a material dispenser and a material receptacle.

20. The method of claim 19, wherein the material dispenser is selected from a paper dispenser and a liquid dispenser.

21. The method of claim 19, wherein the material receptacle is selected from a waste receptacle and a recycling receptacle.

22. The method of claim 18, wherein the material sensor is adapted to be retrofitted to an existing material dispenser or material receptacle.

23. The method of claim 18, further comprising disposing an electronic traffic sensor that senses presence of a person in a selected location or within a selected proximity to the traffic sensor as a measure of traffic;
transmitting data relating to the measure of traffic to the base station; and
using the processor to perform one or more operations based on the measure of traffic;
wherein sending a notification comprises advising of amount of traffic at the selected location.

24. The method of claim 18, further comprising assigning an electronic beacon to the user;
wherein the beacon automatically establishes wireless communication with the base station when within a wireless communications range;
wherein communication of the beacon with the base station indicates that the user is at the location of the base station;
wherein a location of the user is logged according to the location of the base station.

25. The method of claim 18, wherein the notification comprises at least one of SMS, email, and push notification.

26. The method of claim 18, wherein the notification is a real-time notification.

* * * * *